United States Patent
Moskovich et al.

(10) Patent No.: US 7,123,421 B1
(45) Date of Patent: Oct. 17, 2006

(54) COMPACT HIGH PERFORMANCE ZOOM LENS SYSTEM

(75) Inventors: Jacob Moskovich, Cincinnati, OH (US); Iain A. Neil, Calabasas, CA (US); Takanori Yamanashi, Woodland Hills, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 11/112,098

(22) Filed: Apr. 22, 2005

(51) Int. Cl.
 *G02B 15/14* (2006.01)

(52) U.S. Cl. .................. 359/683; 359/689; 359/686; 359/691

(58) Field of Classification Search .............. 359/685, 359/686, 689, 695, 683, 676, 691, 692
See application file for complete search history.

(56) References Cited

U.S. PATENT DOCUMENTS

| | | | |
|---|---|---|---|
| 4,256,381 A | 3/1981 | Kreitzer | |
| 5,416,639 A * | 5/1995 | Yamanashi | 359/683 |
| 5,572,276 A * | 11/1996 | Hirakawa | 359/684 |
| 5,642,224 A * | 6/1997 | Suzuki | 359/557 |
| 5,739,961 A | 4/1998 | Nakayama et al. | |
| 5,754,346 A | 5/1998 | Nakayama et al. | |
| 5,784,205 A | 7/1998 | Nakayama et al. | |
| 6,002,528 A * | 12/1999 | Tomita | 359/684 |
| 6,016,228 A | 1/2000 | Uzawa | |
| 6,122,111 A * | 9/2000 | Neil et al. | 359/689 |
| 6,185,048 B1 | 2/2001 | Ishii et al. | |
| 6,246,519 B1 * | 6/2001 | Suzuki | 359/557 |
| 6,331,917 B1 | 12/2001 | Ishii et al. | |
| 6,414,799 B1 | 7/2002 | Uzawa et al. | |
| 6,510,008 B1 | 1/2003 | Miyauchi et al. | |
| 6,563,643 B1 * | 5/2003 | Hayakawa et al. | 359/557 |
| 6,580,564 B1 * | 6/2003 | Nagahara | 359/683 |
| 6,587,281 B1 | 7/2003 | Hozumi et al. | |
| 6,646,814 B1 | 11/2003 | Uzawa et al. | |
| 6,714,355 B1 | 3/2004 | Miyauchi | |
| 6,788,474 B1 | 9/2004 | Hozumi et al. | |

FOREIGN PATENT DOCUMENTS

GB 975160 11/1964

* cited by examiner

*Primary Examiner*—Scott J. Sugarman
*Assistant Examiner*—Darryl J. Collins
(74) *Attorney, Agent, or Firm*—Morrison & Foerster LLP

(57) ABSTRACT

A compact high performance objective zoom lens system is disclosed that provides optimum optical performance over the entire zoom focal length range at focus distances from close to infinity. The system comprises, from object space to image space, one focusing objective lens group (comprising a focus lens group and a stationary lens group) and three zoom lens groups aligned on the optical axis. The focus lens group and the zoom lens groups are axially movable along the optical axis for focusing and zooming. In one embodiment, the system has a focal length zoom region from about 19 mm to 90 mm, an aperture of F/2.7 and substantially the same optical performance as high quality fixed objective lenses of the same range. The performance characteristics of this system makes it suitable for use with both film and electronic detector cameras.

30 Claims, 5 Drawing Sheets

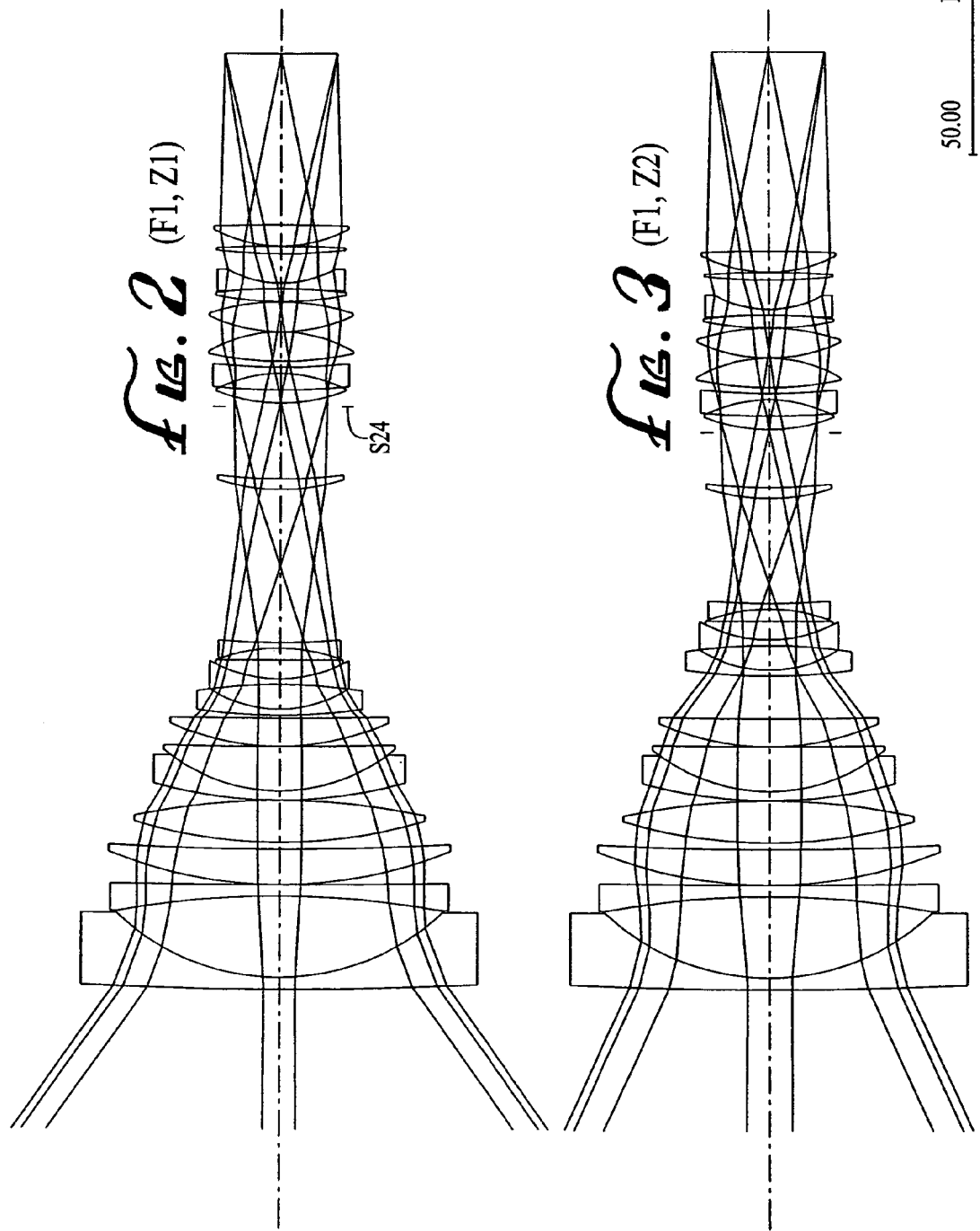

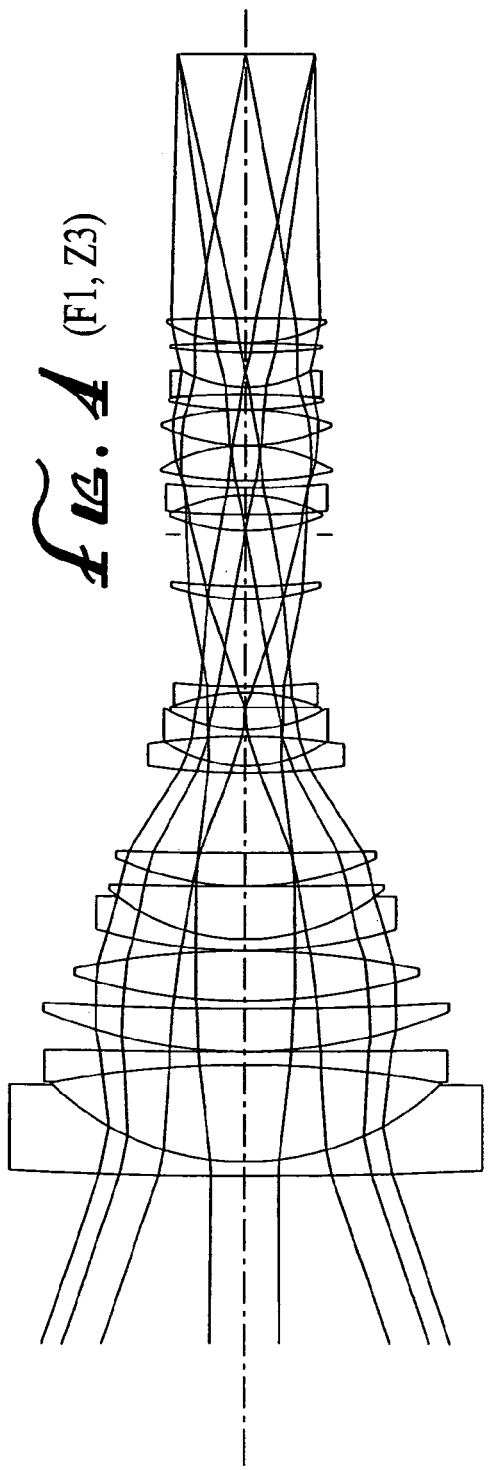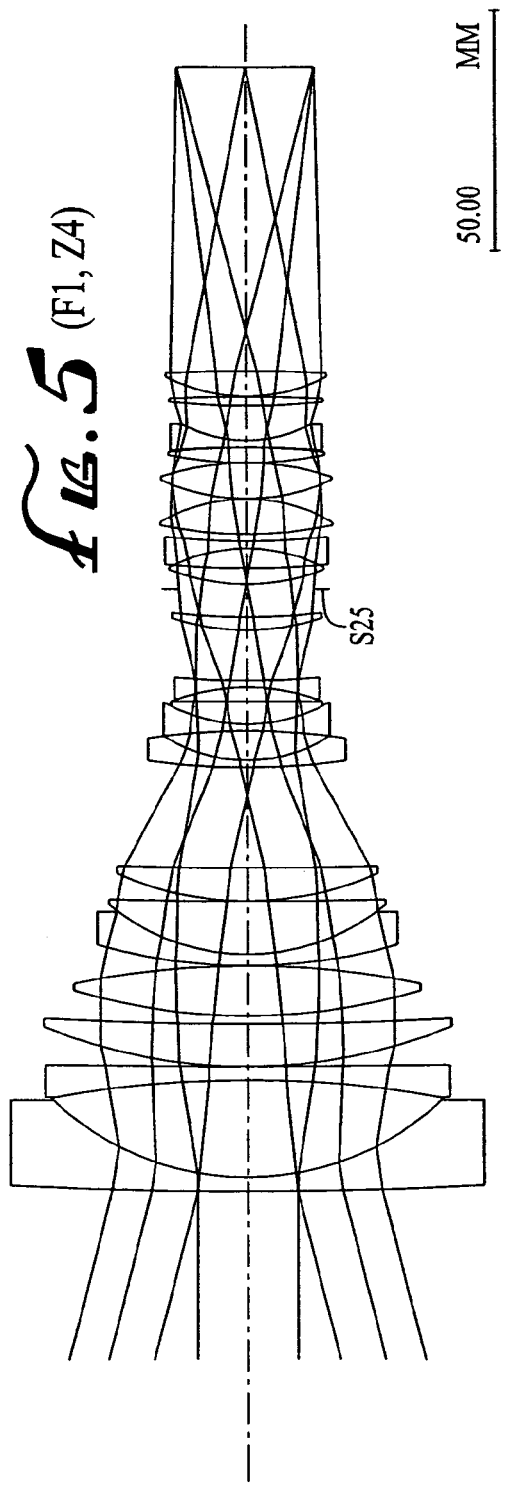

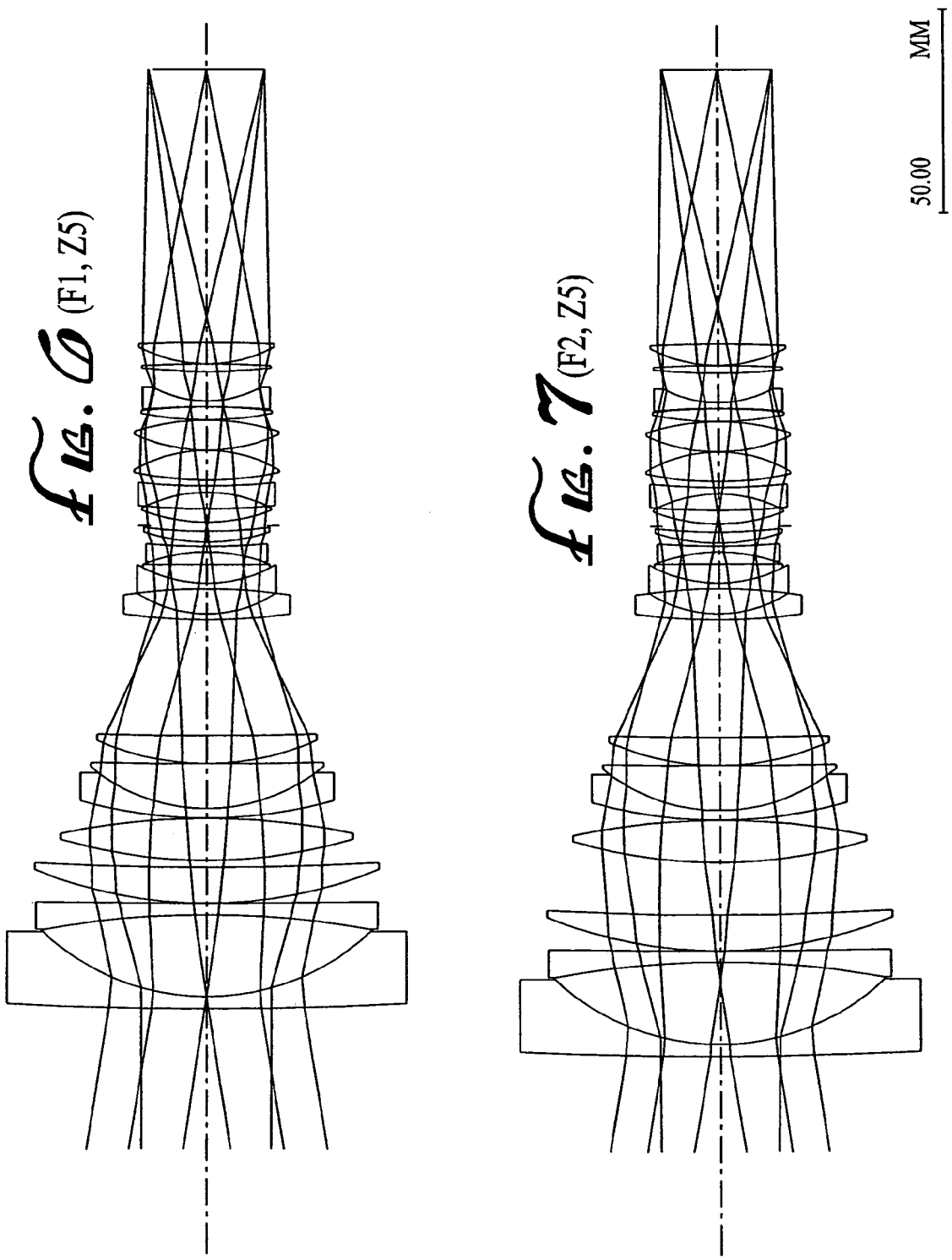

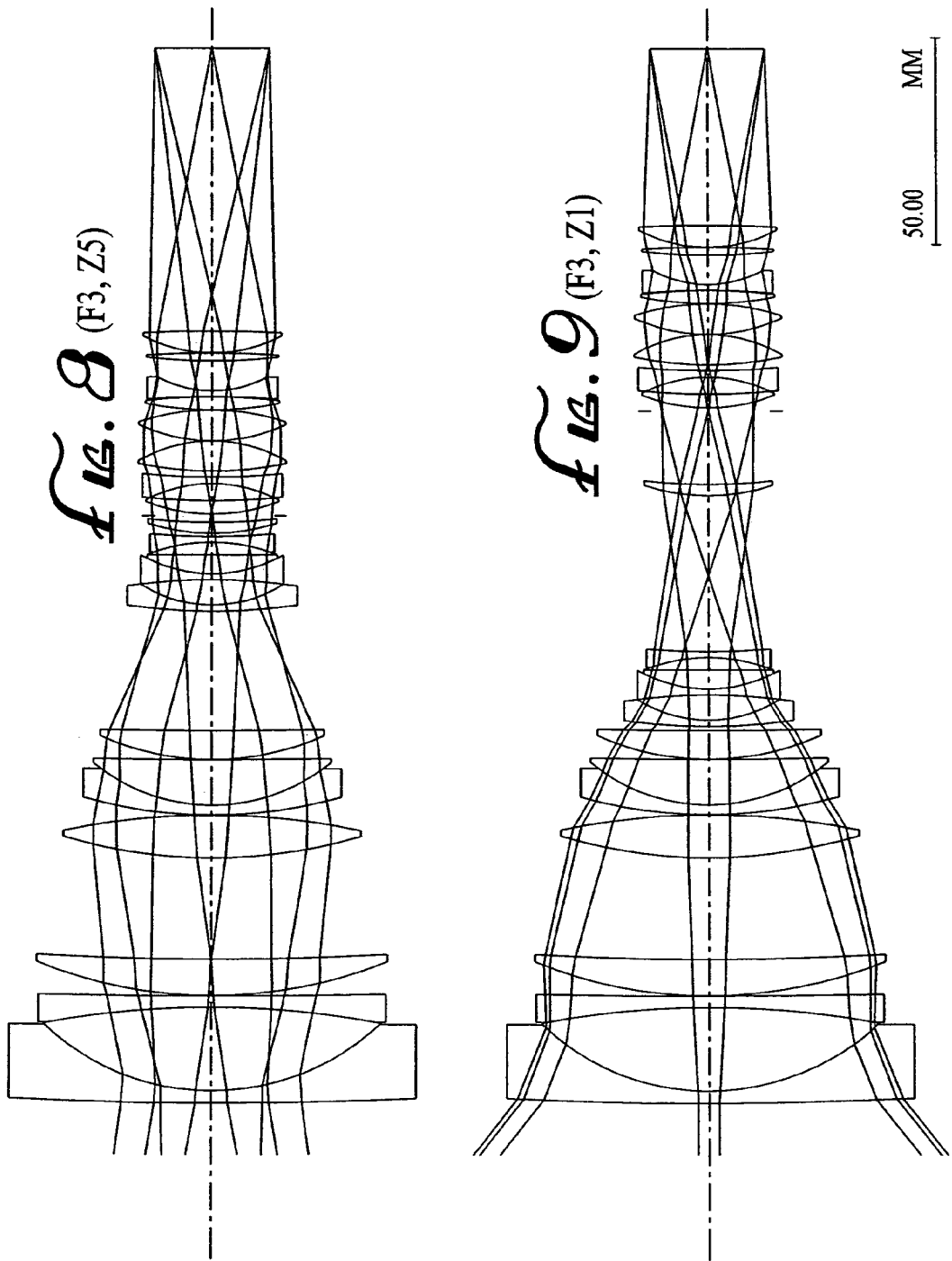

COMPACT HIGH PERFORMANCE ZOOM LENS SYSTEM

BACKGROUND OF THE INVENTION

1. Field of the Invention

This invention relates to an optical objective lens system for cameras and, in particular, to a compact high performance zoom lens system that produces a high quality image over the full zoom range.

2. Description of Related Art

High performance optical systems, such as for cinematography, high definition television ("HDTV") and advanced television ("ATV") require superior optical characteristics and performance that have historically been achieved using separate objective lenses of different fixed focal lengths to provide different photographic functions that are determined or influenced by the focal length.

However, there are cinematographic advantages to using zoom lenses to vary the effective focal length of the objective lens without needing to change objective lenses. In addition, zoom lenses may provide a cost reduction as compared to the cost of several different fixed focal length lenses, particularly within the normal range of desired focal lengths that might be used in photographing normal scenes that require a range from very wide angle to standard focal lengths. Notwithstanding these advantages, previously available zoom lenses also had one or more undesirable limitations such as a limited range of focal lengths, the inability to focus adequately over the entire focal length range, the inability to focus on close objects, the lack of adequate optical performance over the entire focal length range and focus distance, the cost, the large size and the like. U.S. Pat. No. 6,122,111 (the '111 patent) discloses a high performance zoom lens system that improved upon previously available zoom lenses and provides improved optical performance over the entire zoom focal length range and at focus distances from very close to infinity. The zoom lens system of the '111 Patent has a focal length zoom region from about 14.5 mm to 50 mm and provides optical performance similar to that of high quality fixed objective lenses of the same range, including an aperture suitable for capturing images in low light conditions using conventional detectors.

However, recent advances in detector technology such as in film and electronic sensors have created a need for objective lenses, including zoom lenses, to perform well with a multitude of detectors. In addition, the light sensitivity of these detectors has improved to the point where objective lenses, including zoom lenses, having lesser speed or full aperture are acceptable even in low light conditions. Thus, the smallest F-number, which is a commonly accepted technical term used to describe the speed or aperture of a lens (but in an inverse direction), can now be increased without substantially affecting low light sensitivity. For example, where a lens full aperture of F/2.0 was previously necessary with conventional detectors, a lesser lens full aperture of F/2.8 produces a similar result with these new detectors. With this reduction in apertures, compact objective lens designs, including zoom lenses, that are smaller in size (including length, diameter and weight) and cheaper to produce (as compared to a series of fixed focal length lenses) are now possible.

SUMMARY OF THE INVENTION

Embodiments of the present invention are directed to a compact high performance objective zoom lens system that provides optimum optical performance over the entire zoom focal length range and at focus distances from very close to infinity. The objective zoom lens system of the present invention collects radiation from object space and images the radiation at an image plane located just after the lens.

In one embodiment, a compact zoom lens system is disclosed having a focal length zoom region from about 19 mm to 90 mm and substantially the same optical performance as high quality fixed objective lenses of the same range. Note that this embodiment was selected as providing a reasonably wide angle lens with a reasonably long focal length, yet maintaining a reasonable diameter lens at a reasonable length. In addition, an aperture of F/2.7 was chosen as being acceptable for use with state of the art detectors having lower light requirements, enabling the lens to be even more compact. However, it should be understood that although this embodiment is described herein for purposes of explaining the invention, embodiments of the present are not constrained to this embodiment.

For purposes of comparison, the zoom lens system of the '111 Patent was designed to have an aperture of F/2.2, and has two focusing groups, two zoom groups, and one stationary group at the rear. There is an iris inside the last zoom group. However, significant design changes were required in order to design a lens having an aperture of F/2.7 as in the present invention. The compact high performance zoom lens system of the present invention comprises, in order from object space to image space, one focus lens group, a single stationary lens group, and three zoom lens groups aligned on the optical axis. The focus lens group and the zoom lens groups are axially movable along the optical axis for focusing and zooming but with the single stationary lens group and the real image plane of the camera remaining at fixed locations. One compact high performance objective zoom lens can take the place of a number (e.g. eleven) of fixed focal length lenses, and it is only slightly longer than fixed focal length lenses within the same range.

BRIEF DESCRIPTION OF THE DRAWINGS

FIGS. 2–9 are optical diagrams of the zoom lens system of FIG. 1 illustrating different positions of the focus lens groups and zoom lens groups to produce different focal lengths and focus distances.

DETAILED DESCRIPTION OF PREFERRED EMBODIMENTS

Figure 1:
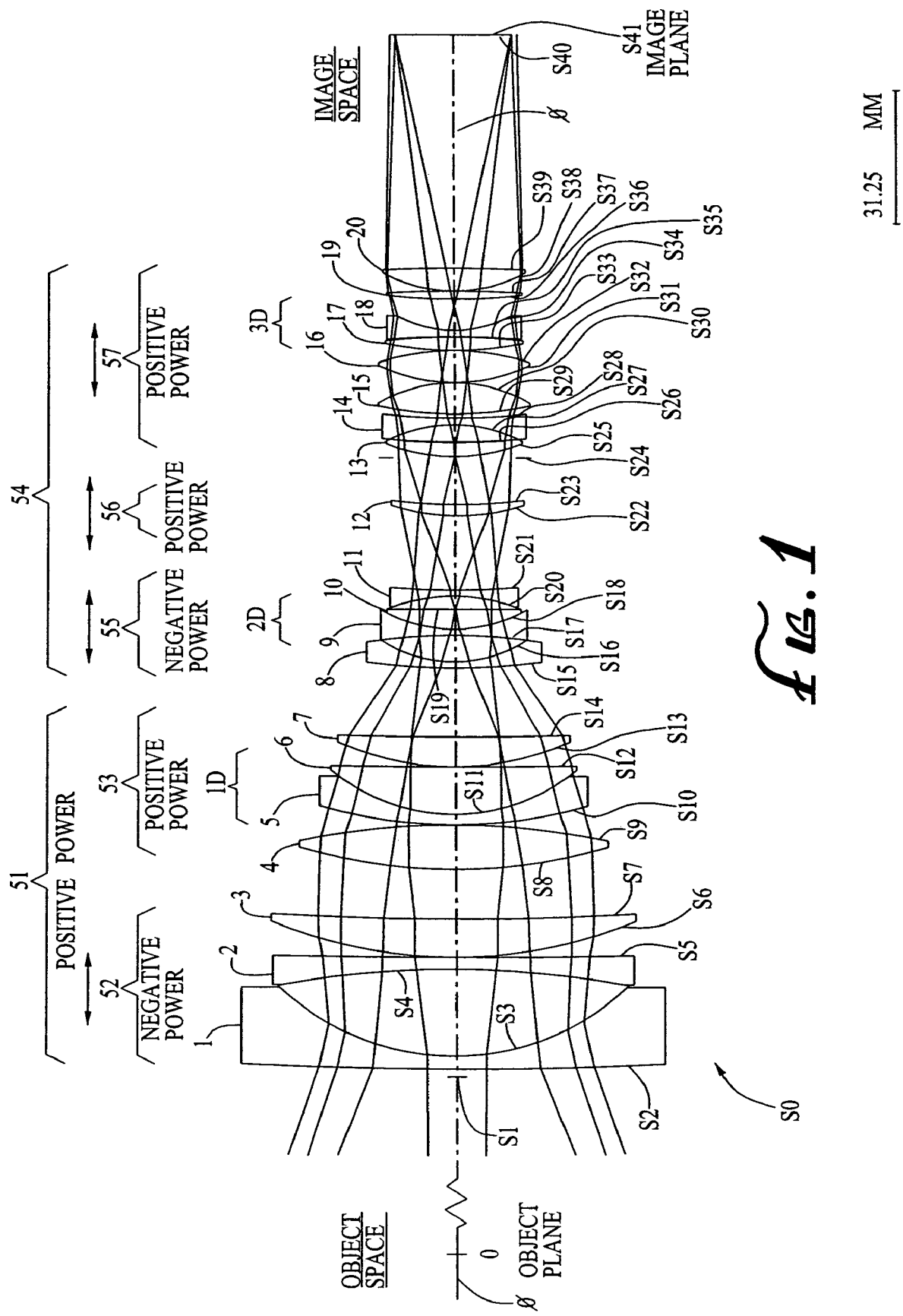
FIG. 1 is an optical diagram of the compact high performance objective zoom lens system of the present invention.

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

A preferred embodiment of the present invention will now be described by way of a design example with accompanying figures and tables. Referring first to FIG. 1, each lens element is identified by a numeral from 1 through 20 and the general configuration of each lens element is depicted, but the actual radius of each lens surface is set forth below in a table. The lens surfaces, including dummy optical surfaces used for design calculation purposes, are identified by the letter "S"followed by a numeral from S1 through S41.

Each lens element has its opposite surfaces identified by a separate but consecutive surface number as, for example, lens element 1 has lens surfaces S2 and S3, lens element 12 has lens surfaces S22 and S23 and so forth, as shown in FIG. 1, except that for doublet lens components 1D, 2D and 3D the coincident facing lens surfaces are given a single surface number. For example, doublet 1D is comprised of lens element 5 having a front lens surface S10 and a rear lens surface S11 and lens element 6 having a front lens surface S11 (coincidental) and a rear lens surface S12. The location of the object to be photographed, particularly as it relates to focus distance, is identified by a vertical line and the letter "O" on the optical axis, and a dummy optical surface that is used in the optical data tables is identified by the vertical line numbered S40, and the real image surface is identified by the numeral S41. Dummy surface S40 used for making the calculations substantially coincides with real image surface S41 at all positions of the focus and zoom lens groups. All of the lens surfaces are spherical except lens surfaces S3 and S26 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 50, of this invention. Beginning from the end facing the object O to be photographed, i.e. the left end in FIG. 1, the focusing objective lens group 51 comprises a focus lens group 52 comprised of lens elements 1, 2 and 3 and a stationary lens group 53 comprised of lens element 4, a first doublet 1D comprised of lens elements 5 and 6, and lens element 7. A zoom lens group 54 comprises a first zoom lens group 55, a second zoom lens group 56 and a third zoom lens group 57 that together provide zooming while maintaining a constant image location. The first zoom lens group 55 includes, from left to right in FIG. 1, lens element 8, a second doublet 2D comprised of lens elements 9 and 10, and a singlet lens element 10. The second zoom lens group 56 includes a singlet lens element 12. The third zoom lens group 57 includes, from left to right in FIG. 1, an adjustable optical stop (iris) S24, singlet lens elements 13–16, a third doublet 3D comprising lens elements 17 and 18, and singlet lens elements 19 and 20.

The positive or negative power of each lens element is set forth below in TABLE 1. The resultant optical power of each subgroup of lenses is as follows; the focus lens group 52 is negative, the stationary lens group 53 is positive, the first zoom lens group 55 is negative, the second zoom lens group 56 is positive, and the third zoom lens group 57 is positive. The combined optical power of the focusing objective lens group 51 is positive.

Each of the lens groups 52, 55, 56 and 57 are movable in both directions along the optical axis. Lens group 52 moves for focusing, while lens groups 55, 56 and 57 move for zooming. The stationary lens group 53 remains stationary and at a fixed distance from the real image surface S41. The horizontal arrows with arrowheads on both ends in the upper portion of FIG. 1 indicate that each of the lens subgroups 52, 55, 56 and 57 are movable in both axial directions but in a monotonic manner (i.e. in only one direction when progressing from one extreme to the other of adjustments).

While only the lens elements are physically shown in FIG. 1, it is to be understood that conventional mechanical devices and mechanisms are provided for supporting the lens elements and for causing axial movement of the movable lens groups in a conventional lens housing or barrel.

The lens construction and fabrication data for the above described zoom lens system 50 is set forth below in TABLE 1, which is extracted from data produced by CODE V® optical design software that is commercially available from Optical Research Associates, Inc., Pasadena, Calif., U.S.A., which was also used for producing the optical diagrams FIGS. 1–9. All of the data in TABLE 1 is given at a temperature of 25° C. (77° F.) and standard atmospheric pressure (760 mm Hg). Throughout this specification, including the Tables, all measurements are in millimeters (mm) with the exception of wavelengths which are in nanometers (nm). In TABLE 1, the first column "ITEM" identifies each optical element and each location, i.e. object plane, dummy surface, etc., with the same numeral or label as used in FIG. 1. The second and third columns identify the "Group" and "Subgroup," respectively, to which that optical element (lens) belongs with the same numerals used in FIG. 1. The fourth column "Surface" is a list of the surface numbers of the object (line "O" in FIG. 1 and "Object Plane" in TABLE 1), the dummy optical surface S41, the Stop (iris) S24 and each of the actual surfaces of the lenses, as identified in FIG. 1. The fifth and sixth columns "Focusing Position" and "Zoom Position," respectively, identify three typical focus positions (F1, F2 and F3) of the focus lens group 52 and five typical positions (Z1, Z2, Z3, Z4 and Z5) of the zoom lens groups 55–57 wherein there are changes in the distance (separation) between some of the surfaces listed in the fourth column, as described below more thoroughly. The seventh column, headed by the legend "Radius of Curvature," is a list of the optical surface radius of curvature for each surface, with a minus sign (−) meaning the center of the radius of curvature is to the left of the surface, as viewed in FIG. 1, and "Flat" meaning either an optically flat surface or a dummy optical surface. The asterisk (*) for surfaces S3 and S26 indicate these are aspheric surfaces for which the "radius of curvature" is a base radius, and the formula and coefficients for those two surfaces are set forth as a footnote to TABLE 1 at the * (asterisk). The eighth column "Thickness or Separation" is the axial distance between that surface (fourth column) and the next surface. For example, the distance between surface S2 and surface S3 is 3.000 mm.

The last three columns of TABLE 1 relate to the "Material" between that surface (fourth column) and the next surface to the right in FIG. 1, with the column "Type" indicating whether there is a lens (Glass) or empty space (Air) between those two surfaces. All of the lenses are glass and the column "Code" identifies the optical glass. For convenience, all of the lens glass has been selected from glass available from Ohara Corporation and the column "Name" lists the Ohara identification for each glass type, but it is to be understood that any equivalent, similar or adequate glass may be used.

The last column of TABLE 1 headed "Aperture Diameter" provides the maximum diameter for each surface through which the light rays pass. All of the maximum aperture diameters, except for the Stop surface S24, are given at a wavelength of 546.1 nanometers for a maximum image height of about 13.9 mm and a constant f-number of F/2.7 at the Image Plane, for all Focus and Zoom Positions. The maximum aperture diameter of the Stop surface S24 is given in TABLE 1 at a wavelength of 546.1 nanometers and an f-number of F/2.7 at the Image Plane for Zoom Position Z5. For Zoom Positions 1, 2, 3 and 4 the maximum aperture diameters at the Stop surface S24 at a wavelength of 546.1 nanometers and an f-number of F/2.7 at the Image Plane are 22.10 mm, 23.74 mm, 25.16 mm and 27.43 mm, respectively. At the Image Plane S41, the Maximum Aperture Diameter is given as an approximate value.

TABLE 1

OPTICAL PRESCRIPTION

| Item | Group | Sub-Group | Surface | Focusing Position | Zoom Position | Radius of Curvature (mm) | Thickness or Separation (mm) | Material Type | Code | Name | Aperture Diameter (mm) |
|---|---|---|---|---|---|---|---|---|---|---|---|
| Object Plane | | | S1 | F1 | All | Flat | Infinite | Air | | | |
| | | | | F2 | All | | 810.000 | | | | |
| | | | | F3 | All | | 352.000 | | | | |
| 1 | 51 | 52 | S2 | All | All | 1063.066 | 3.000 | Glass | SLAH59 | 816466 | 93.00 |
| | | | S3 | All | All | 51.696* | 20.347 | Air | | | 78.92 |
| 2 | 51 | 52 | S4 | All | All | −211.395 | 2.800 | Glass | SFPL53 | 439950 | 78.87 |
| | | | S5 | All | All | 2053.522 | 0.150 | Air | | | 79.21 |
| 3 | 51 | 52 | S6 | All | All | 110.458 | 8.881 | Glass | STIH6 | 805254 | 79.86 |
| | | | S7 | F1 | All | 658.340 | 1.750 | Air | | | 79.10 |
| | | | | F2 | All | | 12.972 | | | | |
| | | | | F3 | All | | 24.482 | | | | |
| 4 | 51 | 53 | S8 | All | All | 123.797 | 10.542 | Glass | SPHM53 | 603655 | 67.85 |
| | | | S9 | All | All | −169.812 | 0.125 | Air | | | 66.64 |
| 5 | 51 | 53 | S10 | All | All | 116.511 | 2.350 | Glass | STIH53 | 847238 | 58.43 |
| 6 | 51 | 53 | S11 | All | All | 45.106 | 10.911 | Glass | SFPL51 | 497816 | 53.56 |
| | | | S12 | All | All | 873.710 | 0.125 | Air | | | 52.37 |
| 7 | 51 | 53 | S13 | All | All | 66.583 | 6.872 | Glass | SLAH59 | 816466 | 50.66 |
| | | | S14 | All | Z1 | 973.939 | 0.764 | Air | | | 49.49 |
| | | | | All | Z2 | | 10.680 | | | | |
| | | | | All | Z3 | | 16.206 | | | | |
| | | | | All | Z4 | | 20.264 | | | | |
| | | | | All | Z5 | | 29.240 | | | | |
| 8 | 54 | 55 | S15 | All | All | 151.327 | 1.450 | Glass | SLAM3 | 717479 | 38.09 |
| | | | S16 | All | All | 28.614 | 6.213 | Air | | | 32.00 |
| 9 | 54 | 55 | S17 | All | All | −115.404 | 1.450 | Glass | SBSM18 | 639554 | 31.76 |
| 10 | 54 | 55 | S18 | All | All | 33.001 | 4.664 | Glass | STIH53 | 847238 | 29.00 |
| | | | S19 | All | All | −11785.600 | 2.861 | Air | | | 28.32 |
| 11 | 54 | 55 | S20 | All | All | −40.025 | 1.450 | Glass | SBSM9 | 614550 | 27.96 |
| | | | S21 | All | Z1 | 140.781 | 38.107 | Air | | | 27.36 |
| | | | | All | Z2 | | 25.754 | | | | |
| | | | | All | Z3 | | 17.977 | | | | |
| | | | | All | Z4 | | 9.877 | | | | |
| | | | | All | Z5 | | 1.000 | | | | |
| 12 | 54 | 56 | S22 | All | All | 49.273 | 2.549 | Air | SLAH58 | 883408 | 28.68 |
| | | | S23 | All | Z1 | 110.396 | 18.211 | Air | | | 28.65 |
| | | | | All | Z2 | | 14.155 | | | | |
| | | | | All | Z3 | | 10.973 | | | | |
| | | | | All | Z4 | | 6.594 | | | | |
| | | | | All | Z5 | | 1.637 | | | | |
| Stop | 54 | 57 | S24 | All | All | Flat | 0.518 | Air | | | 28.78 |
| 13 | 54 | 57 | S25 | All | All | 43.816 | 3.253 | Glass | SFPL51 | 497816 | 29.40 |
| | | | S26 | All | All | 873.710* | 4.116 | Air | | | 29.26 |
| 14 | 54 | 57 | S27 | All | All | −35.604 | 1.450 | Glass | SNSL36 | 517524 | 29.26 |
| | | | S28 | All | All | 100.434 | 1.681 | Air | | | 31.11 |
| 15 | 54 | 57 | S29 | All | All | 82.308 | 7.242 | Glass | SFPL51 | 497816 | 32.60 |
| | | | S30 | All | All | −35.982 | 0.100 | Air | | | 33.08 |
| 16 | 54 | 57 | S31 | All | All | 41.224 | 7.435 | Glass | SFPL53 | 439950 | 32.71 |
| 17 | | | S32 | All | All | −63.519 | 0.100 | Air | | | 32.14 |
| 17 | 54 | 57 | S33 | All | All | 82.450 | 3.224 | Glass | SNPH1 | 808228 | 29.68 |
| 18 | 54 | 57 | S34 | All | All | −190.474 | 1.450 | Glass | SLAH79 | 816466 | 28.96 |
| | | | S35 | All | All | 26.399 | 7.305 | Air | | | 26.42 |
| 19 | 54 | 57 | S36 | All | All | 201.165 | 1.886 | Glass | SNPH1 | 808228 | 28.89 |
| | | | S37 | All | All | −910.736 | 0.100 | Air | | | 29.20 |
| 20 | 54 | 57 | S38 | All | All | 35.778 | 5.071 | Glass | SFPL53 | 439950 | 30.77 |
| | | | S39 | All | Z1 | −576.303 | 4.000 | Air | | | 30.75 |
| | | | | All | Z2 | | 10.491 | | | | |
| | | | | All | Z3 | | 15.926 | | | | |
| | | | | All | Z4 | | 24.345 | | | | |
| | | | | All | Z5 | | 29.204 | | | | |

TABLE 1-continued

OPTICAL PRESCRIPTION

| Item | Group | Sub-Group | Surface | Focusing Position | Zoom Position | Radius of Curvature (mm) | Thickness or Separation (mm) | Material Type | Code | Name | Aperture Diameter (mm) |
|---|---|---|---|---|---|---|---|---|---|---|---|
| Dummy Surface | | | S40 | All | All | Flat | 38.500 | Air | | | 30.03 |
| Image Plane | | | S41 | All | All | Flat | 0.000 | Air | | | 27.80 |

*Surface profiles of aspheric surfaces S3 and S26 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Curvature)
Y = Aperture height, measured perpendicular to optical axis
K, A, B, C, D = Coefficients
Z = Position of surface profile for a given Y value, as measured along the optical axis from the pole (i.e. axial vertex) of the surface.
The coefficients for the surface S3 of lens 1 are:
K = −1.0493E+00
A = 4.1484E−07
B = 1.0025E−11
C = 2.9558E−14
D = −7.0724E−18
The coefficients for the surface S26 of lens 13 are:
K = 0.0000E+00
A = 9.4858E−06
B = 6.2385E−09
C = 5.7827E−12
D = 1.0431E−14

The foregoing footnote * to TABLE 1 includes the equation for calculating the shape of the aspheric surfaces S3 and S26 for the value Z, wherein CURV is the curvature at the pole of the surface, Y is the height or distance from the optical axis of a specific point on the surface of the glass, K is the conic coefficient, and A, B, C and D are the 4th, 6th, 8th, and 10th, respectively, order deformation coefficients which are a well known equation and values for calculating the shape of an aspheric surface. Use of aspherical surfaces provides for the correction of aberrations in the zoom lens while enabling a smaller overall size and a simpler configuration. In particular, the aspherical surface in the focus lens group helps with correction of distortion and other field-dependent aberrations, while the asphere in the third zoom lens group contributes to the correction of spherical and other pupil-dependent aberrations.

From the specifications for the individual lens elements (Items 1–20) and the separation between lens elements set forth in TABLE 1, the focal lengths of each lens element and then each group of lens elements (i.e. focus lens group 52, zoom lens groups 55, 56 and 57, and stationary lens group 53) may be calculated by using the aforementioned CODE V® optical design software, and those calculated group focal lengths are as follows:

Focus lens group 52 (elements 1–3)=−100.96;
Stationary lens group 53 (elements 4–7)=+56.52;
First zoom lens group 55 (elements 8–11)=−22.78;
Second zoom lens group 56 (element 12)=+98.27; and
Third zoom lens group 57 (elements 13–20)=+53.64.

The overall power of the objective lens group (focus lens group 52 and stationary lens group 53) is positive at all focus positions F1, F2 and F3, because focal lengths of two subgroups with separation are computed as (1/focal length 1)+(1/focal length 2)−(separation/(focal length 1×focal length 2))=1/focal length total.

Also, it should be noted that the zoom lens system 50 is provided with one optical stop at the surface S24 which controls the diameter of the aperture through which light rays may pass at that point to thereby cause any light rays in the zoom lens system radially beyond that diameter to be stopped. The optical stop is the location at which a physical iris is located. The iris is located within the third zoom group 57, and moves with that zoom group. Note that in FIG. 2, for example, the rim rays pass through the tic marks of the optical stop S24 with room to spare, while in FIG. 5, the rim rays are almost touching the tic marks of the optical stop S24 as they pass through the optical stop. This shows that the iris located at S24 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 1, act as field stops at all focus and zoom positions as depicted in FIGS. 2–9.

The four lens groups 52, 55, 56 and 57 are each axially movable independently and their respective movements are coordinated by any convenient means, such as conventional mechanical devices such as cams or the like, to accomplish the desired focusing and zooming functions. The focus lens group 52 moves independently of the zoom lens groups 55, 56 and 57.

Referring to TABLE 1, for illustrating the scope and versatility of the present invention there are three different Focus Positions F1, F2 and F3 and five different Zoom Positions Z1, Z2, Z3, Z4 and Z5 set forth in the data which, in effect, provides specific data for fifteen (3×5=15) different combinations of positions for the four movable lens groups. For Focus Position F1 the Object Plane O is assumed to be at infinity, for F2 the Object Plane is at an intermediate distance of about 810 mm, and for F3 the Object Plane O is at a close distance of about 352 mm (i.e., 352 mm away from the front vertex of the lens). At each of these three Focus Positions F1, F2 and F3, the focus lens group 52 remains in the same position throughout the full range of movement of the zoom lens groups 55, 56 and 57 (indicated by "All" in the Zoom Position column of TABLE 1). Similarly, for each of the five Zoom Positions Z1, Z2, Z3, Z4 and Z5 set forth in TABLE 1, the zoom lens groups 55, 56 and 57 remain in the same respective positions throughout the full ranges of movement of the focus lens group 52 (indicated by "All" in the Focus Position column of TABLE 1). For example, for Focus Position F1 the distance (Thickness or Separation column) to the next surface to the right in FIG. 1 from the Object Plane O is infinity (i.e. focus is at infinity) and from S7 is 1.759 mm, while the variable distances at S14, S21 and S39 are variable over their full ranges for zooming ("All" in the Zoom Position column) on the object to be photographed that is at infinity focus, without changing the focus lens group position, i.e. spacing at S7. Similarly, for Focus Position F2 there is an intermediate focus distance to the object O of 810 mm and the spacing at S7 is 12.972 mm, while the spacings at S14, S21 and S39 for the zoom elements are variable over their full ranges. The Zoom Positions Z1, Z2, Z3, Z4 and Z5 are representative of five positions of the zoom lens groups 55, 56 and 57 with Zoom Positions Z1 and Z5 being the extreme positions and Z2, Z3 and Z4 being intermediate positions for all focus lens group positions. The focal length of the lens system 50 varies for different focus distances and Zoom Positions and, for example, at infinity focus and for Zoom Position Z1 the focal length is 19 mm, for Zoom Position Z2 the focal length is 30 mm, for Zoom Position Z3 the focal length is 40 mm, for Zoom Position Z4 the focal length is 55 mm, and for Zoom Position Z5 the focal length is 90 mm. Of course, it will be understood that continuous focusing is available between the extreme Focus Positions F1 and F3, that continuous zooming is available between the extreme Zoom Positions Z1 and Z5, and that any combination of continuous focusing and zooming is available within the described focus and zoom ranges with the lens system 50.

Referring now to FIGS. 2–9, the zoom lens system 50 is shown with the focus lens groups and zoom lens groups in various positions and with light ray traces for those positions. FIG. 2 represents the focus position F1 and zoom position Z1 for which data is set forth above in TABLE 1 with infinity focus and a small focal length of about 19 mm. FIG. 3 represents the focus position F1 and zoom position Z2 from TABLE 1 with infinity focus and a focal length of about 30 mm. FIG. 4 represents the focus position F1 and zoom position Z3 from TABLE 1 with infinity focus and a focal length of about 40 mm. FIG. 5 represents the focus position F1 and zoom position Z4 from TABLE 1 with infinity focus and a focal length of about 55 mm. FIG. 6 represents the focus position F1 and zoom position Z5 from TABLE 1 with infinity focus and a focal length of about 90 mm. FIG. 7 represents the focus position F2 and zoom position Z5 from TABLE 1 with an intermediate focus of about 810 mm. FIG. 8 represents the focus position F3 and zoom position Z5 from TABLE 1 with a close focus of about 352 mm. FIG. 9 represents the focus position F3 and zoom position Z1 from TABLE 1 with a close focus of about 352 mm. FIG. 9 is provided to fully represent the extremes of focusing. Note that the light rays entering the lens in FIG. 9 are at their most extreme angle and perpendicular height from the optical axis, and that the lens elements are able to capture all of these light rays. It should also be noted from FIGS. 2–9 that the pair of light ray traces closest to the axis from object space (at the left in the Figures) diverge from the optical axis in the object space.

Normally, the iris of a lens system is located behind the last moving lens group (to the right in FIGS. 2–9) but zoom lens system 50 has the iris S24 located within the third zoom lens group 57 and therefore the iris S24 moves axially therewith. The size of the aperture of iris S24 is adjusted as the third zoom lens group 57 moves axially, as described above, with respect to the maximum aperture diameters listed in TABLE 1 and is given with its largest value in TABLE 1.

Also, it should be noted that the size of the aperture of iris S24 is not dependent on the position of the focus lens group 52. By this arrangement, the zoom lens system 50 maintains a constant f-number of about 2.7 in the image space through the zoom range and through the focus range.

The optical performance data of zoom lens system 50 is set forth below in TABLE 2 wherein the diffraction based polychromatic modulation transfer function ("MTF") data (modulation versus spatial frequency) is stated in percent (%) for five different Field Positions in eight different combinations of the zoom and focus positions set forth in TABLE 1, as representative examples, as well as the full field distortion data in percent (%) and the full field relative illumination data in percent (%) for those eight combinations of zoom and focus positions. The Field Positions are set forth in two values, both the actual image height (mm) from the optical axis and the normalized image height, which is the actual image height divided by the maximum image height. The MTF percentages are at the wavelengths and weightings set forth in the right-hand column of TABLE 2, namely at 20 cycles/mm, which is a relatively standard measurement of optical performance, wherein the value "20 cycles/mm" means 20 pairs of black and white lines per millimeter on a chart from which the clarity is determined. All of the performance data is given at a temperature of 25° C. (77° F.), standard atmospheric pressure (760 mm Hg), and at F/2.7 full aperture in image space. However, the zoom lens system 50 does provide substantially constant performance, as for example the MTF values, over a temperature range of 0° to 40° C. (32° to 104° F.) and, if a small degradation in performance (MTF) is acceptable, the operable temperature range can be extended to −10° to 50° C. (14° to 122° F.) or more.

TABLE 2

PERFORMANCE DATA

FIELD POSITIONS

| Image Height (mm) | Normalized Image Height (mm) | FOCUS POSITIONS (F) AND ZOOM POSITIONS (Z) | | | | | | | | Performance Data |
|---|---|---|---|---|---|---|---|---|---|---|
| | | F1, Z1 | F1, Z2 | F1, Z3 | F1, Z4 | F1, Z5 | F2, Z5 | F3, Z5 | F3, Z1 | Description |
| 0 (Axial) | 0 (Axial) | 86.3 (R) (T) | 89.5 (R) (T) | 83.6 (R) (T) | 87.2 (R) (T) | 91.7 (R) (T) | 93.0 (R) (T) | 82.9 (R) (T) | 85.5 (R) (T) | Polychromatic diffraction MTF data (%) at 20 cycles/mm at fixed position and flat image |
| 5.56 | 0.4 | 88.7 87.2 | 83.7 91.1 | 77.6 89.2 | 90.1 83.2 | 92.4 83.2 | 90.7 84.7 | 78.5 78.6 | 88.9 85.1 | surface and at the following wavelengths: 643.8, 587.6, |
| 8.34 | 0.6 | 82.1 76.5 | 79.5 91.7 | 74.2 89.1 | 88.6 79.4 | 91.8 74.7 | 88.1 78.1 | 75.6 72.6 | 82.9 76.7 | 546.1, 486.1 and 455.0 nanometers with respective |
| 11.12 | 0.8 | 81.0 82.6 | 86.3 91.2 | 79.8 80.3 | 84.0 78.9 | 89.0 73.3 | 85.3 76.6 | 74.0 68.2 | 83.0 81.8 | weightings of 70, 80, 90, 70 and 40, where (R) = radial and |
| 13.9 (Full Field) | 1 (Full Field) | 82.6 80.6 | 80.3 79.6 | 86.3 79.7 | 81.7 81.4 | 83.5 77.5 | 82.1 78.6 | 73.6 66.0 | 79.7 75.8 | (T) = tangential azimuths |
| 13.9 (Full Field) | 1 (Full Field) | −3.7 | 2.7 | 2.8 | 1.9 | 1.7 | 1.7 | 1.6 | −5.0 | Full Field Distortion (%) |
| 13.9 (Full Field) | 1 (Full Field) | 61.8 | 60.7 | 67.4 | 74.0 | 60.8 | 60.9 | 60.8 | 59.4 | Full Field Relative Illumination (%) |

In particular, note in TABLE 2 the constancy of performance through zoom and focus. The off-axis (near full field) high relative illumination and high MTF performance (due to low residual lateral chromatic aberration) makes the performance of this lens equally suitable for use with film and/or electronic based detectors. Note also the low full field distortion in TABLE 2, which is preferred for state of the art detectors that have a constant response to light in all areas and will faithfully reproduce distortion in the corners of the image.

It should also be noted that the full field relative illumination in TABLE 2 is between 59–74%. In general, higher values are better, because a low number means that light is falling off in the corners of the picture. High full field relative illumination is preferred for state of the art detectors, which have a constant response to light in all areas and will faithfully reproduce shading in the corners of the image along with changes to the image during zooming. In comparison, the full field illumination of the lens described in the '111 Patent is less than 50%, which was not designed for an electronic detector. Illumination less than 50% may result in shading in an electronic detector, but will likely be acceptable for film.

The so-called "breathing" problem of lenses in general (but which may be more prevalent in zoom lenses) wherein the image changes size from short to long focus is virtually absent in zoom lens system 50 at commonly used close focus distances of three feet or more as measured from the object to the image (i.e. between about F1 and F2 in TABLE 3). The breathing values due to focusing in percent (%) change in the angle of the field of view are given in TABLE 3 below where it can be observed that the values are relatively small for zoom positions Z1–Z5. Note that at infinity focus (F1), breathing is zero because that is the reference field of view. The breathing values are particularly small from infinity (F1) to focus position F2, covering the most commonly used focus range, and are similarly low at the closest focus position at zoom positions Z1, Z2 and Z3. The overall focal length of the movable focus group and the stationary group gives the breathing of TABLE 3. This data can be altered by also moving the stationary lens group, which also increases mechanical complexity.

TABLE 3

BREATHING (%)

| | F1 (Infinity) | F2 (810 mm) | F3 (352 mm) |
|---|---|---|---|
| Z1 | 0.0 | −3.7 | −7.6 |
| Z2 | 0.0 | −2.5 | −5.0 |
| Z3 | 0.0 | −1.8 | −3.7 |
| Z4 | 0.0 | −1.7 | −3.5 |
| Z5 | 0.0 | −0.8 | −1.6 |

The values in TABLE 3 are as measured at a wavelength of 546.1 nanometers based on the difference between the full field principal ray angle (in degrees) at focus position F1 and focus positions F2 and F3, where the full field principal rays at all focus positions produce an image height of about 13.9 mm at the image plane.

TABLE 4 provides the paraxial focal lengths for zoom positions Z1–Z5 at a focus distance of infinity, which are the focal lengths that would result if the lens had no distortion or aberrations.

TABLE 4

PARAXIAL FOCAL LENGTHS (mm)
(Infinity focus distance)

| Z1 | +20.0 |
|---|---|
| Z2 | +30.0 |
| Z3 | +40.0 |
| Z4 | +55.0 |
| Z5 | +87.0 |

However, because every lens has distortion and aberrations, these paraxial focal lengths must be modified. Referring to TABLE 2, a full field distortion of −3.7% is present at focus position F1 and zoom position Z1. This is a relatively big change, because the angles are so large that even a small full field distortion value results in a large change to the field of view. Multiplying the Z1 paraxial focal length of 20 mm by (1−0.037) yields 19.26 mm. Thus, the lens described above has a focal length of about 19 mm at the short end. For the long end, a full field distortion of 1.7% is present at focus position F1 and zoom position Z5. This is a relatively small change, because the angles are small enough that even a small full field distortion value results in very small change to the field of view. Multiplying the Z5 paraxial focal length of 87 mm by (1+0.017) yields 88.5 mm. When the overtravel in the physical product is taken into account, the focal length becomes about 90 mm.

While the present invention has been described in connection with the zoom lens system 50 that is of the appropriate dimensions for use on a 35 mm Cine motion picture film or electronic detector camera, the dimensions of this zoom lens system may be appropriately scaled up or down for use with various film and electronic detector image formats including, but not limited to, 16 mm, Super 16 mm, 35 mm, 65 mm, IMAX®, OMNIMAX® and the like, and various video formats including high definition television (HDTV), advanced television (ATV) and general digital television.

Among the many advantages of the zoom lens system 50 of this invention is that of providing the wide range of focal lengths that are most commonly used in cine which eliminates the need for at least eleven fixed focal length objective lenses, for example including the focal lengths 21, 24, 27, 30, 35, 40, 50, 65, 75, 85 and 90 mm for obtaining the proper versatility for high quality cinematography, whereby the use of this zoom lens system will result in greater flexibility and less cost. Further, the unique design of the zoom lens system 50 creates a smaller lens than most high performance zoom lens systems of comparable range of focal lengths and only slightly larger than the largest fixed focal length objective lens in the same range. Still further, the unique lens design of the zoom lens system 50 virtually eliminates the so-called "breathing" problem wherein the image changes size when the focus is changed from short to long focus distances. Other features and advantages of the zoom lens system 50 will appear to those skilled in the art from the foregoing description and the accompanying drawings.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A high performance zoom lens system comprised of a single focusing objective lens group and multiple zoom lens groups aligned in that order on a common optical axis and arranged to collect radiation emanating from an object space and deliver said radiation to an axially stationary image space as a real image, said single focusing objective lens group comprising a focus lens group of negative optical power and a stationary lens group of positive optical power, said multiple zoom lens groups comprising a first zoom lens group of negative optical power, a second zoom lens group of positive optical power and a third zoom lens group of positive optical power and containing an optical stop of said zoom lens system, each of said focus lens group and said first, second and third zoom lens groups being axially movable, and said stationary lens group being axially stationary.

2. The high performance zoom lens system recited in claim 1, wherein said focus lens group and said stationary lens group have a combined positive optical power.

3. The high performance zoom lens system of claim 1, wherein said first, second and third zoom lens groups are axially movable in a monotonic manner over a full range of focal lengths between a minimum focal length and a maximum focal length of the zoom lens system.

4. The high performance zoom lens system of claim 1, wherein said focus lens group includes a non-spherical, non-plano, optically refractive surface.

5. The high performance zoom lens system of claim 4, wherein said third zoom lens group includes a non-spherical, non-plano, optically refractive surface.

6. The high performance zoom lens system of claim 5, wherein said zoom lens system has all remaining optically refractive surfaces that are substantially at least one of either spherical or plano.

7. The high performance zoom lens system of claim 1, wherein said third zoom lens group includes an adjustable iris.

8. The high performance zoom lens system of claim 1, wherein said focus lens group and said stationary lens group include lens elements for minimizing changes in a size of objects appearing in the real image during changes in focus distance from close to distant objects by axial movement of said focus lens group.

9. The high performance zoom lens system of claim 1, wherein said focus lens group is comprised of at least three optically refractive lens elements and includes at least one aspherical lens surface.

10. The high performance zoom lens system of claim 1, wherein said stationary lens group is comprised of at least four optically refractive lens elements.

11. The high performance zoom lens system of claim 1, wherein said first zoom lens group is comprised of at least four optically refractive lens elements of which one pair of doublet lens elements are included.

12. The high performance zoom lens system of claim 1, wherein said second zoom lens group is comprised of at least one optically refractive lens element.

13. The high performance zoom lens system of claim 1, wherein said third zoom lens group is comprised of at least eight optically refractive lens elements and includes at least one aspherical lens surface.

14. The high performance zoom lens system of claim 1, wherein the zoom lens system includes a lens element having an aspherical lens surface with a profile governed by the following equation and coefficients:

$$Z = \frac{(CURV)Y^2}{1+(1-(1+K)(CURV)^2 Y^2)^{1/2}} + (A)Y^4 + (B)Y^6 + (C)Y^8 (D)Y^{10};$$

wherein
  CURV=1/(Radius of Curvature),
  Y=Aperture height, measured perpendicular to optical axis,
  K, A, B, C, D=Coefficients, and
  Z=Position of surface profile for a given Y value, as measured along the optical axis from the pole (i.e. axial vertex) of the surface; and wherein the coefficients for the surface S3 of lens 1 are
K=−1.0493E+00,
A=4.1484E−07,
B=1.0025E−11,
C=2.9558E−14, and
D=−7.0724E−18.

15. The high performance zoom lens system of claim 14, wherein said aspherical lens surface is included in said focus lens group.

16. The high performance zoom lens system of claim 1, wherein the zoom lens system includes a lens element having an aspherical lens surface with a profile governed by the following equation and coefficients:

$$Z = \frac{(CURV)Y^2}{1 + (1 - (1+K)(CURV)^2 Y^2)^{1/2}} + (A)Y^4 + (B)Y^6 + (C)Y^8 (D)Y^{10};$$

wherein
CURV=1/(Radius of Curvature),
Y=Aperture height, measured perpendicular to optical axis,
K, A, B, C, D=Coefficients, and
Z=Position of surface profile for a given Y value, as measured along the optical axis from the pole (i.e. axial vertex) of the surface; and
wherein the coefficients for the surface S26 of lens 13 are
K=0.0000E+00,
A=9.4858E−06,
B=6.2385E−09,
C=5.7827E−12, and
D=1.0431E−14.

17. The high performance zoom lens system of claim 16, wherein said aspherical lens surface is included in said third zoom lens group.

18. A high performance zoom lens system comprised of a single focusing objective lens group and multiple zoom lens groups aligned in that order on a common optical axis, said single focusing objective lens group having a focus lens group of negative optical power and a stationary lens group of positive optical power, said focus lens group being separately axially moveable along the optical axis and said stationary lens group being axially stationary, said multiple zoom lens groups comprising a first zoom lens group, a second zoom lens group and a third zoom lens group, said first zoom lens group being axially movable in a non-monotonic manner over a full range between minimum and maximum focal lengths, said second zoom lens group being axially movable in a monotonic manner over the full range between minimum and maximum focal lengths, and said third zoom lens group having an optical stop and being axially movable in a monotonic manner over the full range between minimum and maximum focal lengths.

19. The high performance zoom lens system of claim 18, wherein said focus lens group and said stationary lens group have a combined positive optical power.

20. The high performance zoom lens system of claim 18, wherein said focus lens group includes a non-spherical, non-plano, optically refractive surface.

21. The high performance zoom lens system of claim 18, wherein said third zoom lens group includes a non-spherical, non-plano, optically refractive surface.

22. The high performance zoom lens system of claim 18, wherein said third zoom lens group includes an adjustable iris.

23. The high performance zoom lens system of claim 18, wherein said focus lens group and said stationary lens group include lens elements for minimizing changes in a size of objects appearing in the real image during changes in focus distance from close to distant objects by axial movement of said focus lens group.

24. A high performance zoom lens system comprised of a single focusing objective lens group and multiple zoom lens groups aligned in that order on a common optical axis and arranged to collect radiation emanating from an object space and deliver said radiation to an axially stationary image space as a real image, said single focusing objective lens group comprising a focus lens group and a stationary lens group, said focus lens group of negative optical power and being axially movable with at least one non-spherical, non-plano, optically refractive surface, said stationary lens group of positive optical power and being axially stationary, said multiple zoom lens groups comprising first, second and third zoom lens groups, said first zoom lens group of negative optical power and being axially movable, said second zoom lens group of positive optical power and being axially movable, and said third zoom lens group being of positive optical power and axially movable with at least one non-spherical, non-plano optically refractive surface and an adjustable optical stop, said zoom lens system having remaining optically refractive surfaces that are substantially at least one of either spherical or plano, and said zoom lens system via axial positioning of said focus lens group and said multiple zoom lens groups providing a high level of optical performance through focusing and zooming ranges at the real image.

25. The high performance zoom lens system of claim 24, wherein each said non-spherical, non-plano optically refractive surface is an aspherical lens surface.

26. The high performance zoom lens system of claim 24, wherein said single objective focusing lens group has a combined positive optical power.

27. A high performance zoom lens system comprised of glass lens elements (1) through (20) aligned in that order on a common optical axis and arranged to collect radiation emanating from an object space and deliver said radiation to an axially stationary image space as a real image;
said lens elements forming a single objective focusing lens group (51) comprising a focus lens group (52), and a stationary lens group (53), a zoom lens group (54) comprising a first zoom lens group (55), a second zoom lens group (56), and third zoom lens group (57), said focus lens group and said first, second and third zoom lens groups each being axially movable;
said focus lens group comprising lens elements (1), (2) and (3), said stationary lens group comprising lens elements (4), (5), (6) and (7), said first zoom lens group comprising lens elements (8) through (11), said second zoom lens group comprising lens element (12), and said third zoom lens group having an optical stop and comprising lens elements (13) through (20); and
wherein lens element surfaces, dummy surfaces, an iris at an optical stop, an object plane and an image plane are identified as (O) and (S1) through (S41), said lens element surfaces (S3) and (S26) are aspheric, and said lens elements, lens element surfaces, dummy surfaces, iris at the optical stop, object plane and image plane have the following order, relationships and characteristics:

| Item | Group | Sub-Group | Surface | Radius of Curvature (mm) | Thickness or Separation (mm) | Glass Code |
|---|---|---|---|---|---|---|
| Object Plane | | | S1 | Flat | Infinite 810.000 352.000 | |
| 1 | 51 | 52 | S2 | 1063.066 | 3.000 | SLAH59 |
| | | | S3 | 51.696* | 20.347 | |
| 2 | 51 | 52 | S4 | −211.395 | 2.800 | SFPL53 |
| | | | S5 | 2053.522 | 0.150 | |
| 3 | 51 | 52 | S6 | 110.458 | 8.881 | STIH6 |
| | | | S7 | 658.340 | 1.750 12.972 24.482 | |
| 4 | 51 | 53 | S8 | 123.797 | 10.542 | SPHM53 |
| | | | S9 | −169.812 | 0.125 | |
| 5 | 51 | 53 | S10 | 116.511 | 2.350 | STIH53 |
| 6 | 51 | 53 | S11 | 45.106 | 10.911 | SFPL51 |
| | | | S12 | 873.710 | 0.125 | |
| 7 | 51 | 53 | S13 | 66.583 | 6.872 | SLAH59 |
| | | | S14 | 973.939 | 0.764 10.680 16.206 20.264 29.240 | |
| 8 | 54 | 55 | S15 | 151.327 | 1.450 | SLAM3 |
| | | | S16 | 28.614 | 6.213 | |
| 9 | 54 | 55 | S17 | −115.404 | 1.450 | SBSM18 |
| 10 | 54 | 55 | S18 | 33.001 | 4.664 | STIH53 |
| | | | S19 | −11785.600 | 2.861 | |
| 11 | 54 | 55 | S20 | −40.025 | 1.450 | SBSM9 |
| | | | S21 | 140.781 | 38.107 25.754 17.977 9.877 1.000 | |
| 12 | 54 | 56 | S22 | 49.273 | 2.549 | SLAH58 |
| | | | S23 | 110.396 | 18.211 14.155 10.973 6.594 1.637 | |
| Stop | 54 | 57 | S24 | Flat | 0.518 | |
| 13 | 54 | 57 | S25 | 43.816 | 3.253 | SFPL51 |
| | | | S26 | 873.710* | 4.116 | |
| 14 | 54 | 57 | S27 | −35.604 | 1.450 | SNSL36 |
| | | | S28 | 100.434 | 1.681 | |
| 15 | 54 | 57 | S29 | 82.308 | 7.242 | SFPL51 |
| | | | S30 | −35.982 | 0.100 | |
| 16 | 54 | 57 | S31 | 41.224 | 7.435 | SFPL53 |
| 17 | | | S32 | −63.519 | 0.100 | |
| 17 | 54 | 57 | S33 | 82.450 | 3.224 | SNPH1 |
| 18 | 54 | 57 | S34 | −190.474 | 1.450 | SLAH79 |
| | | | S35 | 26.399 | 7.305 | |
| 19 | 54 | 57 | S36 | 201.165 | 1.886 | SNPH1 |
| | | | S37 | −910.736 | 0.100 | |
| 20 | 54 | 57 | S38 | 35.778 | 5.071 | SFPL53 |
| | | | S39 | −576.303 | 4.000 10.491 15.926 24.345 29.204 | |
| Dummy Surface | | | S40 | Flat | 38.500 | |
| Image Plane | | | S41 | Flat | 0.000 | |

28. The high performance zoom lens system of claim 27, wherein the maximum aperture diameters (mm) at each surface (S1) through (S41), excluding said dummy surfaces, are as follows; 93.00 at (S2), 78.92 at (S3), 78.87 at (S4), 79.21 at (S5), 79.86 at (S6), 79.10 at (S7), 67.85 at (S8), 66.64 at (S9), 58.43 at (S10), 53.56 at (S11), 52.37 at (S12), 50.66 at (S13), 49.49 at (S14), 38.09 at (S15), 32.00 at (S16), 31.76 at (S17), 29.00 at (S18), 28.32 at (S19), 27.96 at (S20), 27.36 at (S21), 28.68 at (S22), 28.65 at (S23), 28.78 at (S24), 29.40 at (S25), 29.26 at (S26), 29.26 at (S27), 31.11 at (S28), 32.60 at (S29), 33.08 at (S30), 32.71 at (S31), 32.14 at (S32), 29.68 at (S33), 28.96 at (S34), 26.42 at (S35), 28.89 at (S36), 29.20 at (S37), 30.77 at (S38), 30.75 at (S39), and 27.80 at (S41).

29. The high performance zoom lens system of claim 27, wherein said aspheric lens surface S3 has a profile governed by the following equation and coefficients:

$$Z = \frac{(CURV)Y^2}{1 + (1 - (1+K)(CURV)^2 Y^2)^{1/2}} + (A)Y^4 + (B)Y^6 + (C)Y^8 (D)Y^{10};$$

wherein
CURV=1/(Radius of Curvature),
Y=Aperture height, measured perpendicular to optical axis,
K, A, B, C, D=Coefficients, and
Z=Position of surface profile for a given Y value, as measured along the optical axis from the pole (i.e. axial vertex) of the surface; and
wherein the coefficients for the surface S3 of lens 1 are
K=−1.0493E+00,
A=4.1484E−07,
B=1.0025E−11,
C=2.9558E−14, and
D=−7.0724E−18.

30. The high performance zoom lens system of claim 27, wherein said aspheric lens surface S26 has a profile governed by the following equation and coefficients:

$$Z = \frac{(CURV)Y^2}{1 + (1 - (1+K)(CURV)^2 Y^2)^{1/2}} + (A)Y^4 + (B)Y^6 + (C)Y^8 (D)Y^{10};$$

wherein
CURV=1/(Radius of Curvature),
Y=Aperture height, measured perpendicular to optical axis,
K, A, B, C, D=Coefficients, and
Z=Position of surface profile for a given Y value, as measured along the optical axis from the pole (i.e. axial vertex) of the surface; and
wherein the coefficients for the surface S26 of lens 13 are
K=0.0000E+00,
A=9.4858E−06,
B=6.2385E−09,
C=5.7827E−12, and
D=1.0431E−14.

* * * * *